US008882174B2

(12) United States Patent
Wechs

(10) Patent No.: US 8,882,174 B2
(45) Date of Patent: Nov. 11, 2014

(54) OPERATING SYSTEM AND METHOD FOR A VEHICLE HAVING AN AUTOMATICALLY CLOSING HATCH

(71) Applicant: Bayerische Motoren Werke Aktiengesellschaft, Munich (DE)

(72) Inventor: Martin Wechs, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 42 days.

(21) Appl. No.: 13/753,086

(22) Filed: Jan. 29, 2013

(65) Prior Publication Data

US 2013/0139440 A1 Jun. 6, 2013

Related U.S. Application Data

(63) Continuation of application No. PCT/EP2011/062054, filed on Jul. 14, 2011.

(30) Foreign Application Priority Data

Jul. 30, 2010 (DE) ......................... 10 2010 038 687

(51) Int. Cl.
*B60J 5/02* (2006.01)
*E05F 15/00* (2006.01)

(52) U.S. Cl.
CPC ......... *E05F 15/0026* (2013.01); *E05Y 2400/61* (2013.01); *E05F 2015/0052* (2013.01); *E05Y 2600/45* (2013.01); *E05Y 2400/452* (2013.01); *E05F 15/00* (2013.01); *E05F 2015/0047* (2013.01); *E05Y 2400/86* (2013.01); *E05Y 2900/546* (2013.01)
USPC ............................................ 296/146.8; 49/26

(58) Field of Classification Search
USPC .......... 49/26, 28, 339, 340, 333, 334; 296/56, 296/106, 146.8
See application file for complete search history.

(56) References Cited

U.S. PATENT DOCUMENTS 4,794,248 A * 12/1988 Gray ............................ 250/221
7,228,883 B1 * 6/2007 Murray ......................... 160/201

(Continued)

FOREIGN PATENT DOCUMENTS

CN 1928307 A 3/2007
CN 101010477 A 8/2007

(Continued)

OTHER PUBLICATIONS

International Search Report including English translation dated Aug. 26, 2011 (Four (4) pages).

(Continued)

*Primary Examiner* — Katherine Mitchell
*Assistant Examiner* — Scott Denion
(74) *Attorney, Agent, or Firm* — Crowell & Moring LLP

(57) ABSTRACT

An operating system and method for a vehicle having an automatically closing hatch, includes an operating switch, a programmable electronic controller, and a device for monitoring the hatch opening when the hatch is open. The operating switch generates an operating request signal for closing the hatch when the switch is actuated, the signal being an input signal to the controller. The monitoring device is a light barrier device having at least one light-emitting actuator and at least one light-detecting sensor arranged at the edge region of the hatch opening and also connected to the controller by electrical cables. The controller is programmed such that, when the operating request signal is present and the hatch is open, the controller outputs a pivot command to a closing system for closing the hatch only if the presence of an obstacle is not detected by the monitoring device for the hatch opening.

8 Claims, 1 Drawing Sheet

(56) References Cited

U.S. PATENT DOCUMENTS

| | | | | |
|---|---|---|---|---|
| 7,378,641 | B2 * | 5/2008 | Melcher et al. | 250/221 |
| 7,762,022 | B2 * | 7/2010 | Stadler et al. | 49/506 |
| 7,959,204 | B2 | 6/2011 | Yoshida | |
| 2001/0042820 | A1 | 11/2001 | Wilson | |
| 2004/0095250 | A1 * | 5/2004 | Chapman et al. | 340/686.6 |
| 2005/0168010 | A1 | 8/2005 | Cleland et al. | |
| 2006/0043763 | A1 | 3/2006 | Berklich, Jr. et al. | |
| 2007/0205863 | A1 * | 9/2007 | Eberhard | 340/5.72 |

FOREIGN PATENT DOCUMENTS

| | | | |
|---|---|---|---|
| DE | 101 00 137 | A1 | 8/2001 |
| DE | 10 2004 041 709 | B3 | 10/2005 |
| JP | 2005-125889 | A | 5/2005 |

OTHER PUBLICATIONS

German Search Report including partial English translation dated Oct. 29, 2010 (Nine (9) pages).

Chinese Office Action dated Jul. 8, 2014, including English translation (twelve (12) pages).

* cited by examiner

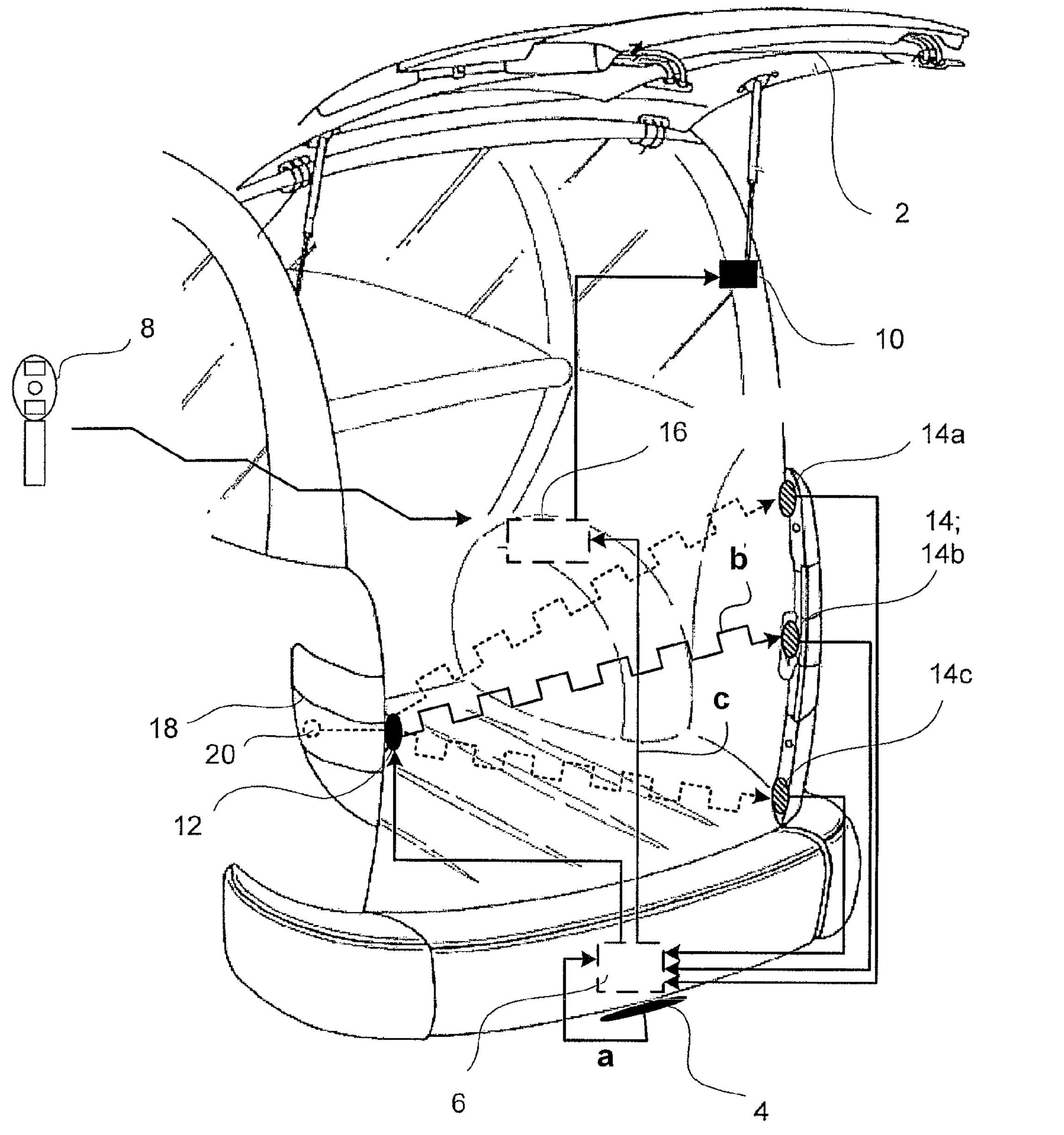
2
10
8
16
14a
14;
14b
b
14c
c
18
20
12
a
6
4

OPERATING SYSTEM AND METHOD FOR A VEHICLE HAVING AN AUTOMATICALLY CLOSING HATCH

CROSS REFERENCE TO RELATED APPLICATIONS

This application is a continuation of PCT International Application No. PCT/EP2011/062054, filed Jul. 14, 2011, which claims priority under 35 U.S.C. §119 from German Patent Application No. DE 10 2010 038 687.1, filed Jul. 30, 2010, the entire disclosures of which are herein expressly incorporated by reference.

BACKGROUND AND SUMMARY OF THE INVENTION

A control device for a vehicle having an automatically opening hatch is known, for example, from German Patent document DE 10 2004 041 709 B3. This control device provides an operating switch for generating an operating request signal preferably by non-contact actuation.

Furthermore, motor vehicles of the applicant are known to have an automatically opening or closing hatch that can be activated by way of remote control via a key depression.

In addition, particularly in connection with automatic window closing systems, jamming protection devices are known which, when a jamming situation is detected, cause a stopping or reversing of the window that is being closed.

It is an object of the invention to further develop a control device and method for automatically closing a hatch with a view to securely preventing a collision.

According to the invention, this and other objects are achieved by providing an operating system and method for a vehicle having an automatically closing hatch, at least one operating switch, a programmable electronic controller, and a device for monitoring the hatch opening when the hatch is open. The operating switch generates an operating request signal for closing the hatch when the switch has been actuated, which signal is an input signal of the controller. The device for monitoring the hatch opening is a light barrier comprising at least one light-emitting actuator and at least one light-detecting sensor which are arranged in the edge region of the hatch opening and are also connected to the controller by way of electric cables. The controller is programmed such that, when the operating request signal is present and the hatch is open, the controller outputs a pivot command to a closing system for closing the hatch only if the presence of an obstacle is not detected by the device for monitoring the hatch opening.

The light-emitting actuator is preferably triggered by the controller for emitting a timed or modulated light so that an obstacle is not erroneously detected as a result of mere sun radiation.

The invention is based on the following considerations. A collision with objects or persons is to be prevented particularly reliably especially when a non-contact proximity sensor is used as the operating switch for triggering an operating request signal for closing a hatch. An accidental triggering of the operating request signal should also not result in a dangerous situation. In particular, during an automatic closing of a rear hatch, there could be the problem that a person who is bending his upper body into the luggage compartment does not notice that the hatch is closing. However, not only is a jamming protection system to be activated, which normally permits a collision and stops or reverses a movement only in the event of increased resistance, but, according to the invention, a collision is to even be prevented or a temporary deactivation is to be achieved.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE illustrates an embodiment of the invention in a schematic view of a motor vehicle having a hatch, which closes automatically as a result of a pivoting command (closing command), and having a device for monitoring the hatch opening which is mounted on the hatch.

DETAILED DESCRIPTION OF THE DRAWING

In the illustrated embodiment, the hatch 2 is constructed as a rear hatch of a motor vehicle. However, a hatch 2 could, for example, also be a door, a front opening hood or a fuel tank cap.

The automatic closing of the rear hatch 2 is initiated, starting from an open state of the rear hatch 2, by a closing command in the form of a control signal "c" of a programmable controller 6 to a closing system, composed, for example, of a further control unit 16 and an electromechanical actuator 10. The rear hatch 2 is then moved, by way of an electrically, hydraulically or pneumatically activatable motor function, into a closed position if the presence of an obstacle is not detected by way of the device 12 and 14 (or 14*a*, 14*b* and 14*c*) for monitoring the luggage compartment opening.

The motor vehicle also includes at least one, but preferably two, proximity sensor(s) which is (are) operatively connected with the controller 6. For the purpose of simplification, only one proximity sensor 4 will be mentioned in the following. The proximity sensor 4 is an operating switch which is to be actuated in an arbitrarily non-contact manner. When the actuation has taken place, it generates an operating request signal "a" which is transmitted as an input signal to the controller 6.

The controller 6 and the proximity switch 4 are either separate programmable cooperating modules or (as illustrated here) are integrated in a single electronic programmable module. The invention may be contained in each module in the form of a program or in the form of program parts.

The controller 6 is preferably constructed such that not only the presence of the operating request signal a is monitored but also, for example, the presence of an access authorization device 8, here in the form of a radio transmitter key. The radio transmitter key 8 could also have an operating switch 4, which is not shown here. The radio transmitter key 8 could communicate directly with the controller 6, or could communicate indirectly with the controller 6 by way of a further control unit 16, which may be assigned to a conventional central locking system.

The at least one proximity sensor 4 is preferably arranged such that a user can cause it to switch or can switch it by swinging his foot in the area between the vehicle body and the road surface. The proximity sensor 4 is particularly arranged below a bumper or is integrated on the bottom side of a bumper into the latter. A proximity sensor of this type is described, for example, in German Patent document DE 10 2004 041 709 B3 within the scope of an automatic opening of a hatch.

In the following, the device 12 and 14 for monitoring the luggage compartment opening for checking the presence of an obstacle will be explained in greater detail.

On the lateral interior edge (here, on the left) of the luggage compartment, preferably close to the taillights 18, a light-emitting actuator is mounted, for example, in the form of an infrared-light emitting diode 12, which is electrically supplied by way of a voltage supply system 20, for example, below the covering of the taillights 18. On the opposite lateral interior edge (here, on the right) of the luggage compartment, also preferably close to the taillights (not visible here), at least one light-detecting sensor 14 is mounted, but preferably three light-detecting sensors 14*a*, 14*b* and 14*c*, which are also electrically supplied by way of a voltage supply system, for example, below the covering of the taillights (on the right vehicle side). The actuators and sensors form a "light barrier function". The actuators and sensors can, however, also be supplied with power by way of the power supply to the brake lights, turn signal lights, luggage compartment illumination lights, or the lights for illuminating the license plate.

By using three sensors, a larger surface of the hatch opening can be monitored. However, the sensors 14*a*, 14*b* and 14*c* are arranged in such an adjacent manner that, if possible, only one actuator (here, the LED) 12 is required. Further, while the illustrated embodiment forms the light barrier function using actuators and sensors on the left and right edges of the luggage compartment, it will be understood that other arrangements are within the scope of the invention provided such arrangements can detect collisions with objects or persons in or near the luggage compartment area.

When an operating request signal a is generated by actuating the operating switch or the proximity sensor 4, the light-emitting actuator 12 is triggered by the controller 6 for emitting a timed light b. An obstacle is detected corresponding to a light barrier principle if the timed light b is not detected by all light-detecting sensors 14*a*, 14*b* and 14*c*. The sensors 14*a*, 14*b* and 14*c* transmit corresponding signals to the controller 6, in which case the analysis for detecting an obstacle is carried out by a corresponding programming, preferably in the controller 6. When the hatch is open, the controller 6 will then emit a pivoting command c to the closing system 16 and 10 for closing the luggage compartment 2 only when no obstacle is detected.

The intensity of the timed light emitted by the infrared-light emitting diode 12 may be variable, for example, as a function of the brightness based on empirically determined values.

The triggering of the infrared-light emitting diode 12 and therefore the activation of the device for monitoring the luggage compartment opening cannot be started before an operating request signal a for closing the hatch is applied, in order to save power. Moreover, it may be slightly delayed to allow a person some time to move away from the closing hatch.

In the event of an intended protruding of objects from the luggage compartment, it may be provided that the rear hatch 2 be partially closed by way of an additional switch that is to be actuated manually.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating system for a vehicle having an automatically closing hatch, the operating system comprising:

an operating switch operatively configured to generate an operating request signal for closing the automatically closing hatch when the operating switch is actuated;

a programmable electronic controller operatively configured to receive the operating request signal;

a light barrier device operatively configured to monitor an interior compartment of the vehicle, the light barrier device comprising at least one light-emitting actuator and at least one light-detecting sensor arranged in respective opposite lateral interior edges of the interior compartment of the vehicle, the light barrier device being coupled to the programmable electronic controller via; cabling, wherein the programmable electronic controller is programmed such that, when the operating request signal is received and the automatically closing hatch is open, a pivot command is output to initiate a closing of the automatically closing hatch only when a presence of an obstacle is not detected by the light barrier device, wherein the interior compartment of the vehicle is a luggage compartment, wherein when the operating request signal is received, activation of the light barrier device is deliberately delayed by a given period of time to allow a person to move away from the automatically closing hatch.

2. The operating system according to claim 1, wherein the at least one light-emitting actuator is controlled via the programmable electronic controller to emit a timed light, and the presence of the obstacle is detected when the timed light is not detected by the at least one light-detecting sensor.

3. The operating system according to claim 1, wherein the at least one light-emitting actuator is an infrared light-emitting diode.

4. The operating system according to claim 1, wherein the operating switch is a proximity sensor that operates in a non-contact manner in a proximity of the hatch.

5. The operating system according to claim 3, wherein the operating switch is a proximity sensor that operates in a non-contact manner in a proximity of the automatically closing hatch.

6. The operating system according to claim 1, wherein the light barrier device is supplied with electric power via a voltage supply connection to at least one of taillights, brakes lights, turn signal lights, luggage compartment illumination lights, and license plate illumination lights of the vehicle.

7. The operating system according to claim 2, wherein an intensity of the timed light is configured to vary in accordance with empirically determined brightness values.

8. The operating system according to claim 1, further comprising:

an additional switch, wherein when the light barrier device detects a protruding object in the luggage compartment, motion of the automatically closing hatch is stopped, and continued motion of the automatically closing hatch thereafter requires manual actuation of the additional switch.

* * * * *